(12) United States Patent
Mount et al.

(10) Patent No.: US 8,770,662 B2
(45) Date of Patent: Jul. 8, 2014

(54) VEHICLE SEAT COVER

(75) Inventors: Christine Mount, Santa Paula, CA (US); Jonathan Johnson, Camarillo, CA (US); Erika Sheppard, Moorpark, CA (US); Glenn Jendrycki, Santa Monica, CA (US)

(73) Assignee: Auto Expressions, LLC, Compton, CA (US)

( * ) Notice: Subject to any disclaimer, the term of this patent is extended or adjusted under 35 U.S.C. 154(b) by 471 days.

(21) Appl. No.: 12/789,237

(22) Filed: May 27, 2010

(65) Prior Publication Data

US 2011/0291447 A1 Dec. 1, 2011

(51) Int. Cl.
*A47C 31/00* (2006.01)

(52) U.S. Cl.
USPC .................. 297/228.12; 112/403; 297/228.1

(58) Field of Classification Search
USPC .......... 297/228.1, 228.12; 112/403, 415, 440, 112/441
See application file for complete search history.

(56) References Cited

U.S. PATENT DOCUMENTS

| | | | | |
|---|---|---|---|---|
| 2,266,505 A * | 12/1941 | McCormick | ............... | 297/228.1 |
| 4,396,227 A * | 8/1983 | Neilson | .................... | 297/228.11 |
| 5,234,252 A * | 8/1993 | Wallach | ........................ | 297/229 |
| 5,265,933 A * | 11/1993 | Croshaw | .................... | 297/228.1 |
| 5,803,539 A * | 9/1998 | Dewar et al. | ............. | 297/228.12 |
| D400,043 S | 10/1998 | Rosenberg | | |
| D400,044 S | 10/1998 | Rosenberg | | |
| 5,857,696 A * | 1/1999 | Inoue et al. | ................. | 280/728.2 |
| 6,003,938 A | 12/1999 | Lachat | | |
| 6,089,659 A * | 7/2000 | Toyota | ..................... | 297/228.11 |
| 6,338,527 B1 * | 1/2002 | Toyota et al. | ................. | 297/229 |
| 6,345,866 B1 * | 2/2002 | Jackson et al. | ........... | 297/228.12 |
| 6,447,059 B1 * | 9/2002 | Jackson et al. | ........... | 297/228.12 |
| 6,652,026 B2 * | 11/2003 | Toyota et al. | ................. | 297/229 |
| D508,360 S | 8/2005 | Inman | | |
| 7,673,939 B2 * | 3/2010 | Taguchi et al. | ............. | 297/218.1 |
| 7,686,392 B2 | 3/2010 | Kenny | | |
| 2002/0043834 A1 * | 4/2002 | Jackson et al. | ............. | 297/228.1 |
| 2004/0036262 A1 * | 2/2004 | Kanuma et al. | ............... | 280/739 |
| 2004/0155499 A1 * | 8/2004 | Chambers et al. | ......... | 297/228.1 |
| 2004/0187277 A1 * | 9/2004 | Akashi et al. | ................. | 24/584.1 |
| 2008/0290643 A1 * | 11/2008 | Hansen | ....................... | 280/801.1 |
| 2009/0033081 A1 * | 2/2009 | Flischer et al. | ............ | 280/743.2 |
| 2011/0316259 A1 * | 12/2011 | Ritter | ......................... | 280/728.1 |

FOREIGN PATENT DOCUMENTS

| | | | | | |
|---|---|---|---|---|---|
| DE | 29815531 | * | 12/1998 | | |
| DE | 19727746 | * | 1/1999 | | |
| DE | 102007062587 A1 | * | 5/2008 | | |
| GB | 2257356 A | * | 1/1993 | ............. | A47C 31/11 |
| JP | 10119694 | * | 5/1998 | | |
| WO | WO 0103970 | * | 1/2001 | | |
| WO | WO 2010003407 | * | 1/2010 | ............. | B60R 21/16 |

* cited by examiner

*Primary Examiner* — David E Allred
(74) *Attorney, Agent, or Firm* — Wood, Herron & Evans, LLP

(57) ABSTRACT

A seat cover for use with vehicle seats with or without side deployed airbags. In an example, the seat cover is made of a uni-body construction with upper and lower sections for respectively covering a seat back and seat cushion. Openings are provided in the upper and lower sections for insertion of the seat back and seat cushion. A side panel is disposed on each lateral side of the upper section that aligns with an expected path of the airbag when deployed. A frangible seam couples the panel to the remaining portion of the seat cover. The frangible seam fails at a force sufficiently less than the force of a deploying airbag. Thus when the airbag is deployed the force consumed by cleaving the frangible seam panel does not impede airbag deployment. Also included is an alignment member to position the panel in the expected path of the deploying airbag.

13 Claims, 5 Drawing Sheets

VEHICLE SEAT COVER

BACKGROUND

1. Field of Invention

The invention relates generally to the field of seat covers for vehicles. More specifically, the present invention relates to a seat cover for use with a seat having a side deployed airbag and adapted to allow deployment of the airbag as intended.

2. Description of Prior Art

Original equipment manufacturers (OEM) of vehicular seats, such as bucket seats used in automobiles, may include airbags that deploy through a lateral side of the upper portion of the seat. It is important that the projected or expected path of a deploying airbag be substantially free to deploy and without barriers or other impediments in its path so that the airbag may become fully inflated. Often, the outer surface of a side airbag equipped vehicle seat includes a weakened section, such as a breakaway seam or scoring, to avoid hindering airbag deployment. Thus, seat covers added to vehicles having side or otherwise deployed airbags should allow airbag deployment as intended.

SUMMARY OF INVENTION

Disclosed herein is a seat cover for use with a vehicle seat, and can accommodate vehicle seats with or without a side deployed airbag. In an example embodiment the seat cover includes an upper section formed from a flexible material to form an enclosure with an opening. The seat cover of this embodiment also includes an elongate side panel on a lateral side of the upper section, the side panel couples to the upper section along an interface. A frangible seam is included with the seat cover of this example that is set along a portion of the interface. The frangible seam fails at a force below a force that impedes airbag deployment. By aligning the side panel with an expected path of a deploying airbag, and the airbag is deployed, the force of the deploying airbag separates the panel from the upper section along the seam to form a gap and fully deploys through the gap. In an alternative embodiment, a lower section can be joined to the upper section, where the lower section is made of a flexible material to form an enclosure with an opening. In an example embodiment, the seam can be an elongated element stitched through the panel and upper section. An optional alignment element can be included with the seat cover that is made of a planar flexible member attached on an end to the upper section adjacent the opening. The alignment element may further include a resilient member set in the flexible member. In an example embodiment, the flexible material is formed from a weave of weft yarn and warp yarn so that the flexible material may flex in any direction. Optionally, the panel can extend from adjacent a portion of the opening and along the lateral side of the upper section to substantially adjacent a distal portion of the opening. Yet further optionally, the seam can extend along the length of a forward looking edge of the panel. The airbag may be deployed through a seam provided in the vehicle seat; the upper section may represent a front side and the frangible seam in the upper section can be disposed in a region between the seam provided in the vehicle seat and the front side.

Also disclosed herein is a seat cover for use with a vehicle seat that is equipped with a side deployed airbag. In this example the seat cover includes an upper section forming an enclosure, the enclosure having an opening for receiving therein a seat back with the side deployed airbag. In this example embodiment, the seat cover further includes a lower section connected to the upper section; that also is formed into an enclosure with an opening. The lower section opening is adapted to receive therein a seat cushion attached to the seat back. A space is defined between the seat back and seat cushion. A frangible seam is included with this seat cover embodiment that extends along a portion of a lateral side of the upper section and adapted to fail at a force below a force that impedes airbag deployment. Thus when the frangible seam is aligned with an expected path of a deploying airbag, and the airbag is deployed, the force of the deploying airbag severs the seam to form a gap in the upper section so that the airbag fully deploys through the gap.

Yet further disclosed herein is an example of a vehicle seat. In this example the vehicle seat includes a seat back having a front, back, and lateral sides. Also provided with the vehicle seat is an airbag in the seat back that is oriented to have a projected airbag deployment path exiting the seat back through a lateral side. A seat cushion is also a part of this embodiment of a vehicle seat that is coupled with the seat back along a portion of the periphery of the seat cushion to define a space between the seat cushion and seat back. Included with the vehicle seat is a seat cover. In this example embodiment the seat cover is made of an upper section that encloses a substantial portion of the seat back and made from a flexible material that forms an enclosure and an opening provided in the flexible material for receiving the seat back. Further included with the embodiment of the vehicle seat is a lower section enclosing a substantial portion of the seat cushion, the upper section comprising a flexible material that forms an enclosure and an opening provided in the flexible material for receiving the seat cushion. A side panel is also provided with the seat cover disposed on a lateral side of the upper section and coupled to the upper section along an interface. The seat cover of this example embodiment includes a frangible seam along a portion of the interface that fails at a force below a force that impedes airbag deployment, so that when the side panel is aligned with the projected airbag deployment path, and the airbag is deployed, the force of the deploying airbag separates the panel from the upper section along the seam to form a gap and fully deploys through the gap. The seam of this example embodiment is made from an elongated element stitched through the panel and upper section. The seat cover of this example embodiment can further include eyelets in the alignment element selectively engageable with hooks attached to straps that depend from the lower section.

BRIEF DESCRIPTION OF DRAWINGS

Some of the features and benefits of the present invention having been stated, others will become apparent as the description proceeds when taken in conjunction with the accompanying drawings, in which.

Figure 1:
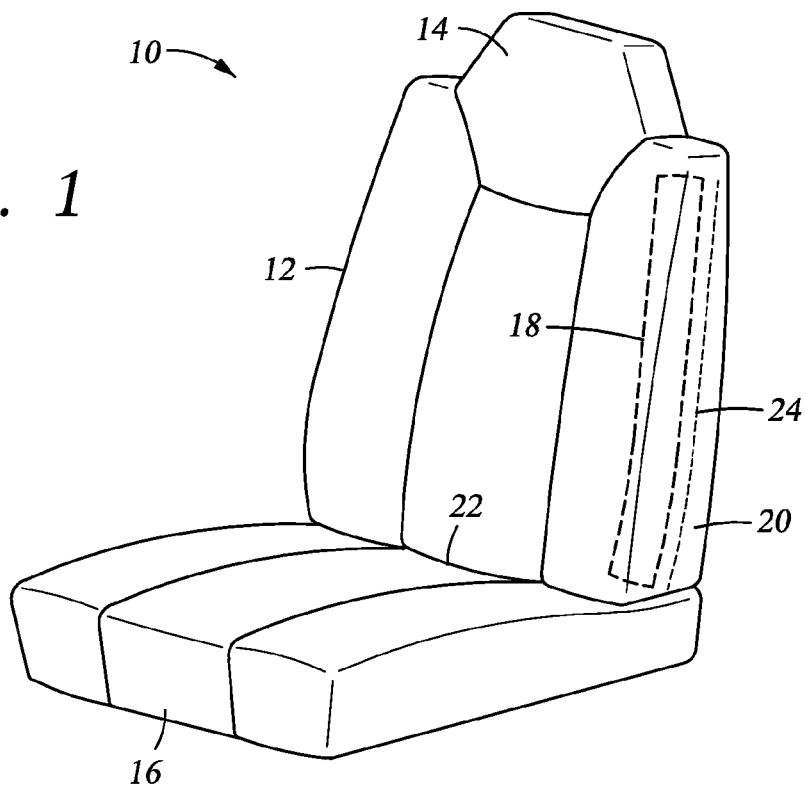
FIG. 1 is a side perspective view of a seat having a side deployed airbag.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The subject(s) of the present disclosure will now be described more fully hereinafter with reference to the accompanying drawings in which embodiments are shown. The subject(s) of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject(s) of the present disclosure described herein are not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is a perspective view of a vehicle seat 10 having a substantially vertical seat back 12. Provided on an upper end of the seat back 12 is a headrest 14; a seat cushion 16 is shown attached along a lower end of the seat back 12. Shown in phantom line is an airbag 18 set within the seat back 12 that extends along a portion of the lateral side 20 of the seat back 12. The material on the outer surface of the vehicle seat 10 is scored or otherwise weakened along a line 24 to facilitate deployment of the airbag 18. A substantially horizontally oriented space 22 is shown along the interface where the seat back 12 couples with the seat cushion 16. For the purposes of discussion herein, the vehicle seat 10 can be used in conjunction with any type of vehicle, such as an automobile, truck, bus, train, aircraft, as well as watercraft, to name but a few.

Figure 2:
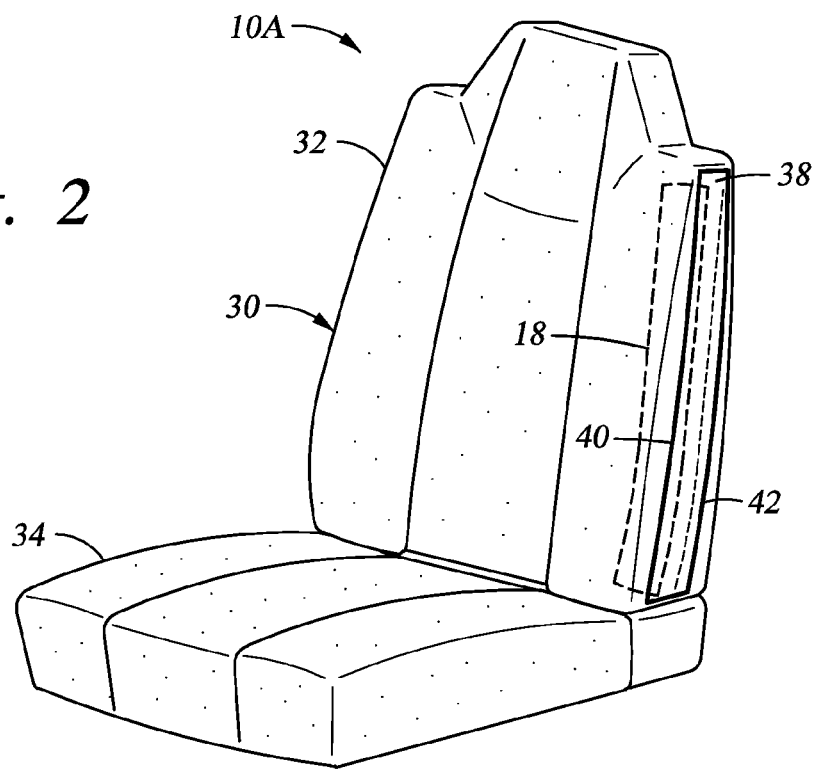
FIG. 2 is an illustration of the seat of FIG. 1 having an embodiment of a seat cover in accordance with the present disclosure.

Referring now to FIG. 2, the vehicle seat 10A is shown having thereon a seat cover 30. In the embodiment of FIG. 2, the seat cover 30 comprises an upper section 32 that encases the seat back 12. Example materials of the seat cover 30 include stretchable fabric and can be made from natural as well as synthetic fibers. It is believed that it is within the scope of those skilled in the art to identify appropriate materials for use in the seat cover 30. The seat cover 30 further includes a lower section 34 that joins with the upper section 32 proximate where an attached lockdown and orientation flap 36 is included with the seat cover 30. The seat cover 30 further includes a panel 38 shown along a lateral side of the seat cover 30 and between front and back sides of the upper section 32. The panel 38 attaches to the seat cover 30 along a front seam 40 and rear seam 42. In the example of FIG. 2 the front seam 40 runs along the region between the airbag 18 and the front side of the upper section 32. Other embodiments exist where the front seam 40 runs substantially aligned with the line 22.

In an example embodiment, the front and/or rear seam 40, 42 fails under an applied stress of a deploying airbag 18. Moreover, in an example embodiment, the resistance applied by the front and/or rear seam 40, 42 up to failure is less than a force that slows or otherwise hinders deployment of the airbag 18. Example embodiments include, the front seam 40 failing thereby forming a gap along the lateral side of the upper section 32 and adjacent the panel 38 and both front and rear seams 40, 42 failing so that the panel 38 becomes detached from the upper section 32. In one example embodiment, the front seam 40, and/or rear seam 42 are formed with a single stitch of an elongated member, such as a filament fiber or thread, that couples the panel 38 to the upper surface 32 along the interface that defines the region where the panel 38 and upper section are joined.

Figures 3, 4:
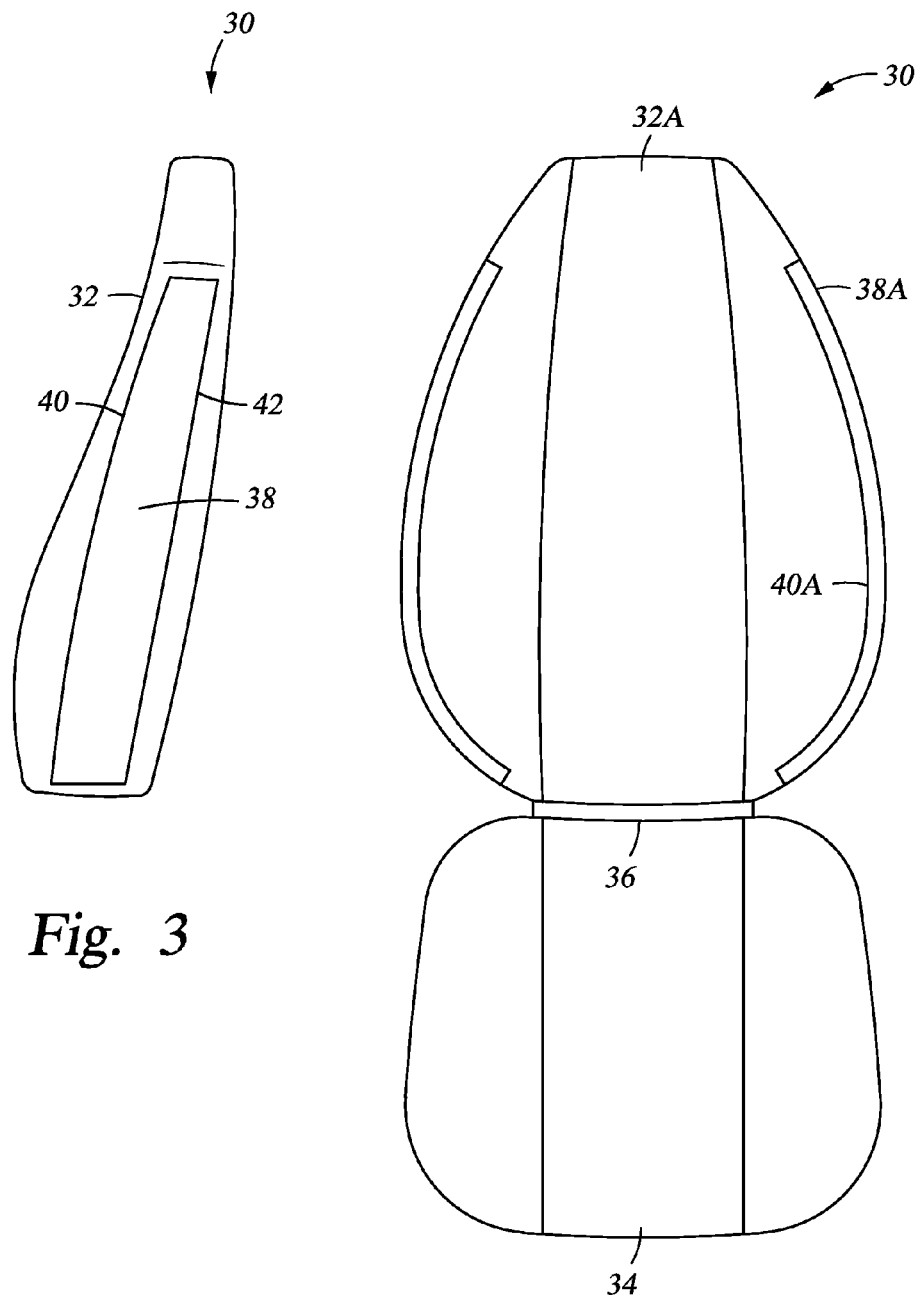
FIG. 3 is a side view of an embodiment of the seat cover of FIG. 2.
FIG. 4 is a frontal view of an embodiment of the seat cover of FIG. 2.

Shown in FIG. 3 is a side view of an example of the upper section 32 of the seat cover 30. In this example, the front seam 40 and rear seam 42 both extend to the lower most portion of the upper section 32 thereby allowing separation of the panel 38 from the remaining portion of the upper section upon cleaving or tearing of one or both of the front and rear seams 40, 42. Optionally, one or both of the front and rear seams 40, 42 can extend fully from top to bottom of the lateral side of the upper section 32. Referring now to FIG. 4, illustrated is a front view of an example of the seat cover 30 wherein the panel 38 extends along the entire lateral periphery of the upper section 32. In this example, the panel 38 begins and terminates adjacent where the upper section 32 and lower, section 34 are adjoined and proximate the attachment of the lockdown flap 36. The panel 38 has a front periphery defined by the front seam 40 that is proximate the front side of the upper section 32. Accordingly, in the example of FIG. 4, by separating the upper section 32 along the entirety of one or both of the front or rear seams 40, 42, a gap can be formed along the entire lateral periphery of the upper section 32.

Figure 5:
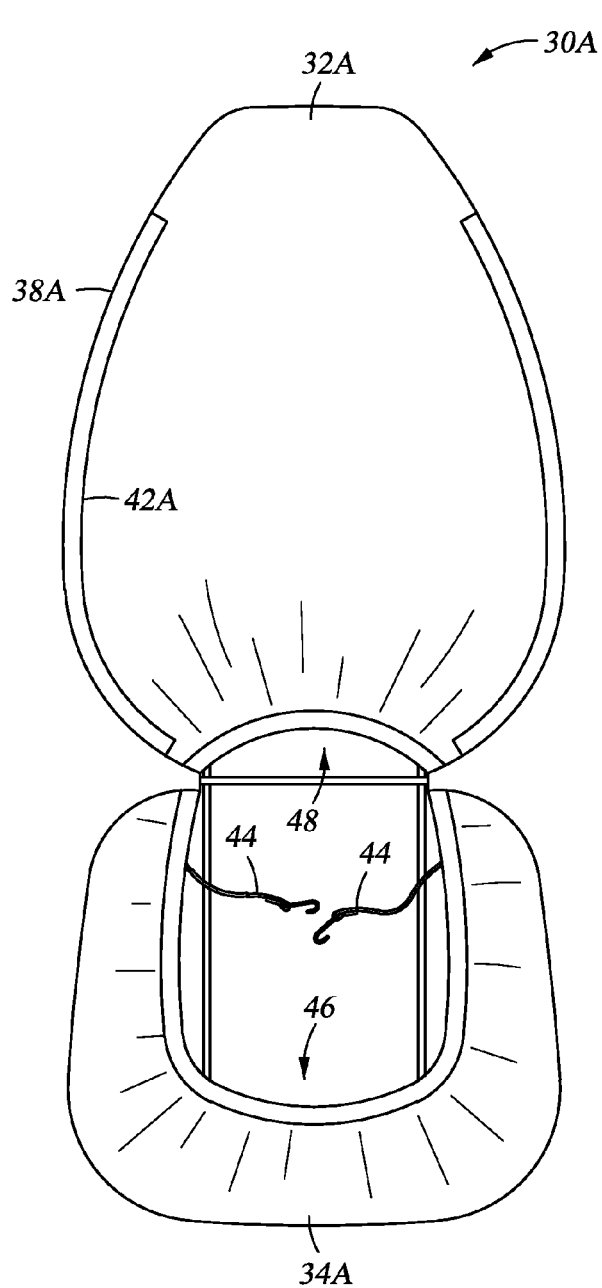
FIG. 5 is a rear view of an embodiment of the seat cover of FIG. 2.

Shown in FIG. 5 is an example of the seat cover 30A, while not covering a seat and laid flat, so that the upper and lower sections 32A, 34A are substantially within the same plane. In this example the rearward facing portion of the upper section 32A is shown. Also in this example, the panel 38A extends substantially along the lateral periphery of the upper section 32A and has a rearward boundary defined by the rear seam 42A, which extends substantially along the outer periphery of the upper section 32A and proximate the rear side of the upper section 32A. Optionally included are straps 44, that may be made of an elastic elongated material, and shown attached on an end to an opening 46 formed in the lower section 34A. The opening 46 is configured to receive therein a seat cushion of a vehicle seat. Similarly, an opening 48 is formed on an end of the upper section 32A for receiving therein a seat back.

Figure 6:
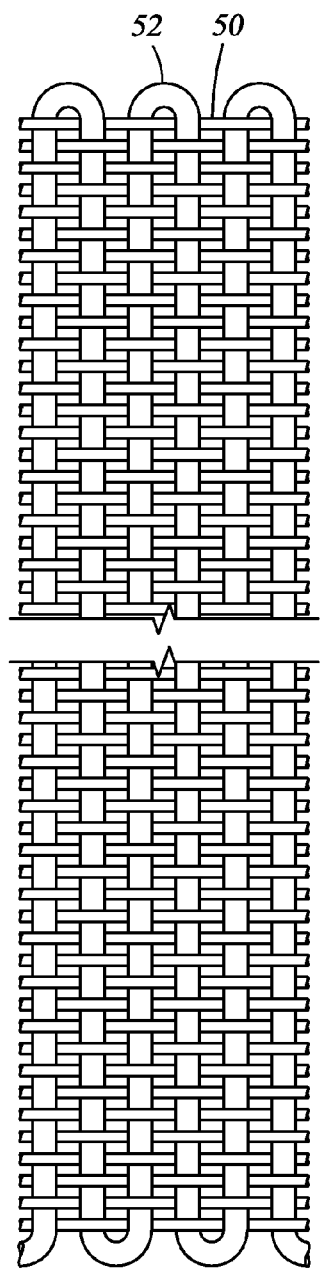
FIG. 6 is an illustration of an example embodiment of a fabric weave used for a portion of an embodiment of the seat cover of FIG. 2.

FIG. 6 illustrates an example of a woven fabric made up of a series of warp yarn elements 50 aligned in a substantially parallel arrangement. Woven with the warp yarn elements 50 is a weft yarn element 52 having 180° bends at the terminal lateral sides of the fabric section. In one embodiment the seat cover 30 is formed from the example fabric of FIG. 6. Employing woven fabric example of FIG. 6 forms a seat cover 30 that can flex in multiple directions facilitating a snug fit between the seat cover 30 and vehicle seats of different sizes or configurations.

Figure 7:
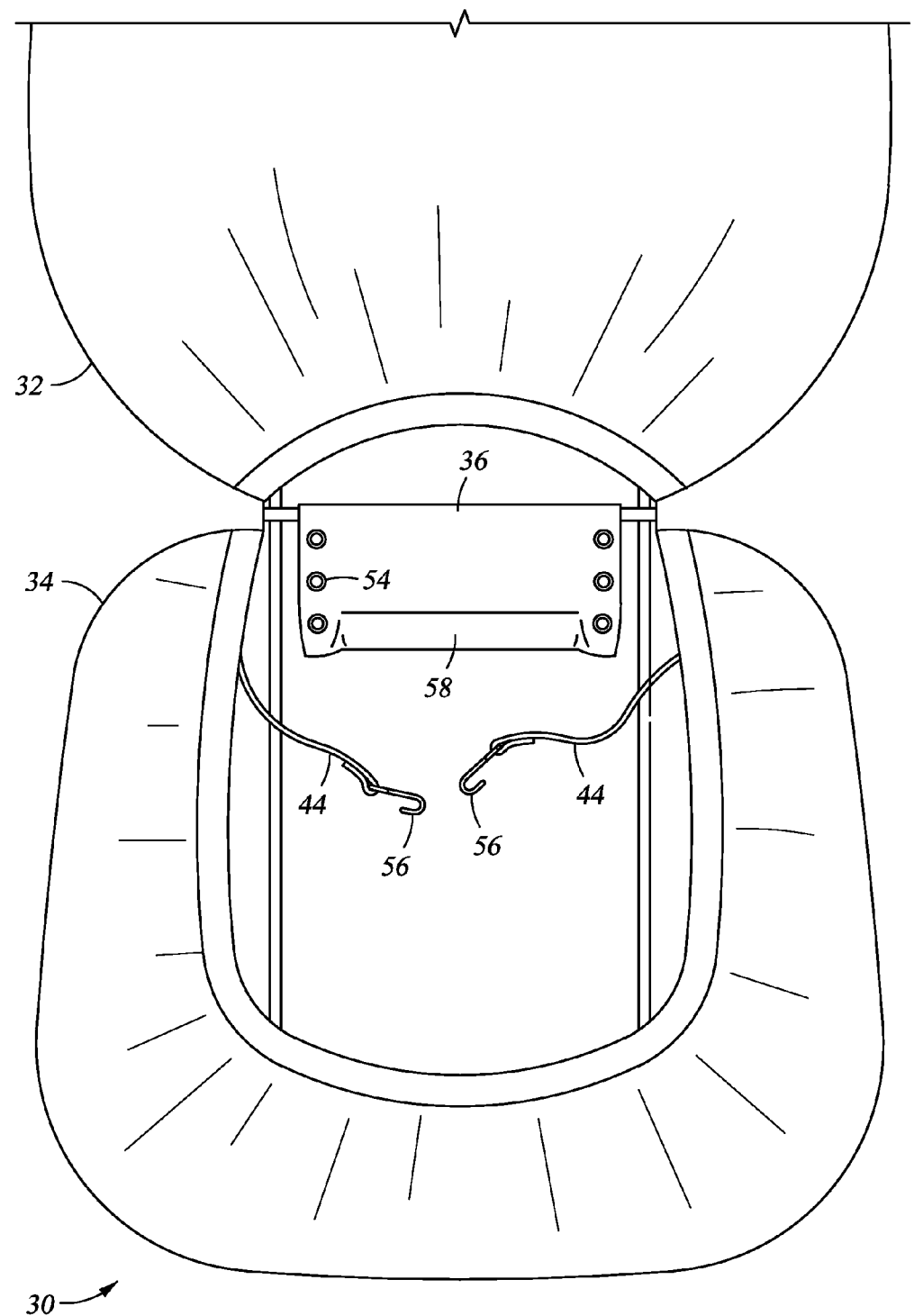
FIG. 7 is an upward looking view of an embodiment of the seat cover of FIG. 2.

FIG. 7 is a view of the lower rear side of the seat cushion 30 and illustrating the lockdown flap 36. As shown in this example the lockdown flap 36 is a substantially planar element which can be made from a heavy duty fabric, such as canvas or a nylon. Included on the lockdown flap 36 of FIG. 7 are a series of eyelets 54 formed on opposing lateral sides that extend along the length of the lockdown flap 36. The eyelets 54 may couple with hooks 56 shown provided on a free end of the straps 44. Embedded within the lockdown flap 36 is a resilient member 58. Example embodiments of the resilient member 58 include solid or tubular elongated foam pieces. One of the advantages of employing a lockdown flap with a resilient member 58 is when a vehicle seat has no gap between the seat back and seat cushion, the resilient member may be inserted between the seat back and seat cushion to secure the seat cover 30 onto a vehicle seat. Additionally, the dimensions of the lockdown flap 36 ensure that when the seat cover 30 is placed over a vehicle seat, the seams 40, 42, and/or panel 38 are aligned in a fashion to not hinder airbag deployment.

Figure 8:
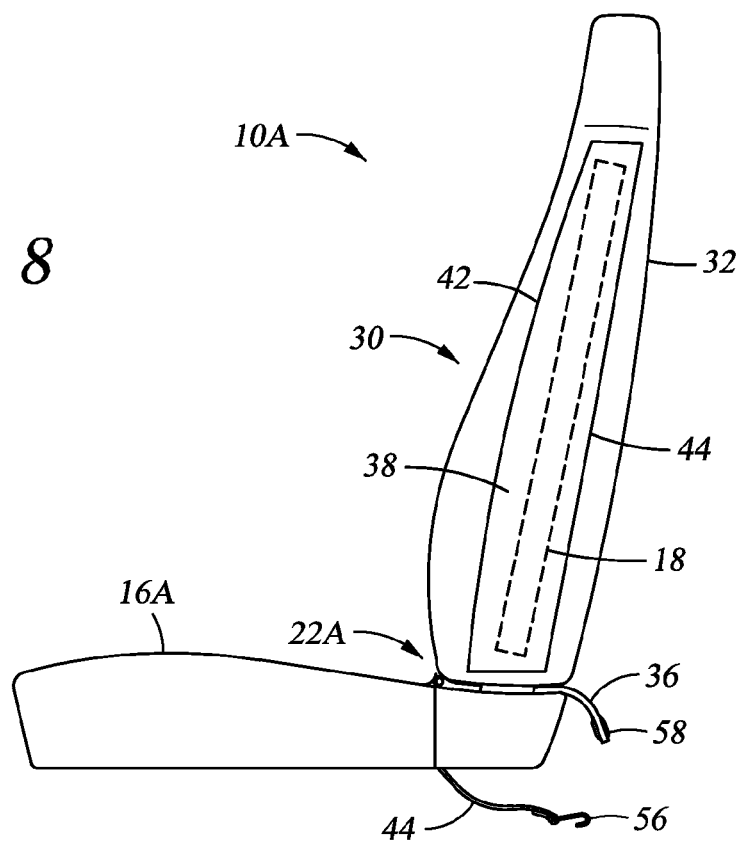
FIG. 8 is a side view of an embodiment of the seat cover of FIG. 2.

In FIG. 8, an example of the seat cover 30 is shown enclosing a vehicle seat 10A. In this example the seat cover 30 is in the process of being installed onto the vehicle seat 10A; the alignment flap 36 has been inserted through the space 22A between the seat back 12 and seat cushion 16. Thus in this example, after pulling the alignment flap 36 through the space 22A, the flap 36 can then be folded under the seat cushion 16A and the straps 44 with hooks 56 be placed into engagement with the eyelets 54 (FIG. 7) so that the seat cover 30 can be secured onto the seat 10A.

Figure 9:
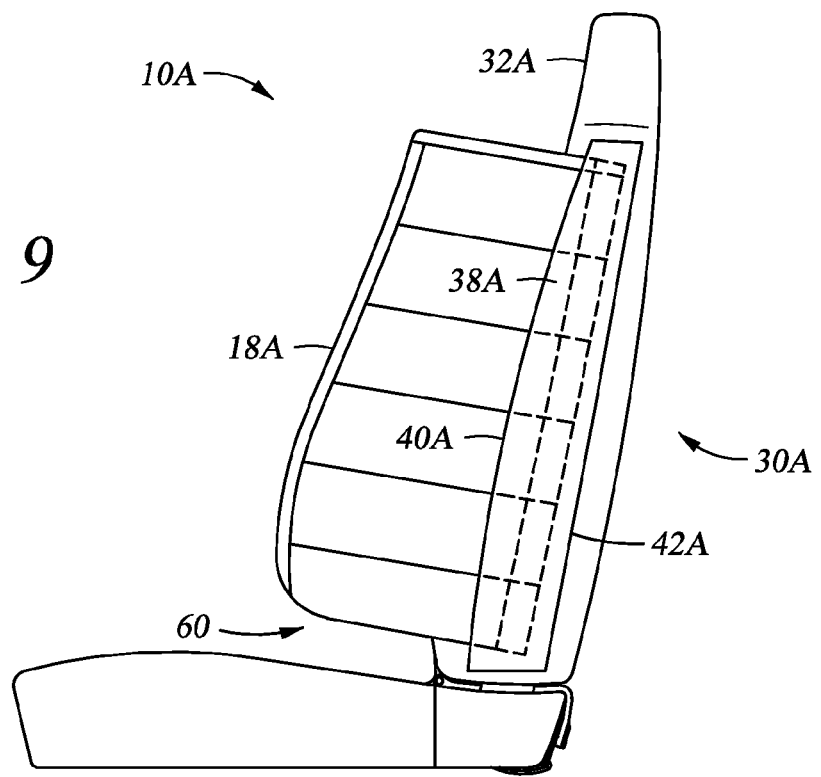
FIG. 9 is a depiction of an airbag deploying through an embodiment of the seat cover of FIG. 2.

Shown in FIG. 9 is an example of the airbag 18A being deployed from within the vehicle seat 10A. During deployment, the airbag 18A breaches the seat cover 30A as one or both of the seams 40A, 42A fails under the applied force of deployment of the airbag 18A. As the airbag 18A deploys and breaches the seam 40A, a gap 60 is formed between the panel 38A and front side of the upper section 32A. It is through the gap 60 that the airbag 18A may fully deploy in an unhindered operation.

In an example embodiment, the seam 40, 42 includes threads combination of appointed coats polyester M160 and coats Nylon 66 M40 threads combination. The top stitching can be M40 (CF Nylon 66 235/3) with a strength of 4470 cN and elongation of 16-31%. In an example embodiment, the underside stitching can be M160 (textured polyester 167/1) having a strength of 590 cN and an elongation of 22-30%. In an example embodiment, a length of the seam 40 can range from about 1,600 mm to about 1,775 mm, wherein the upper and lower ranges can change up to about +/−5%. In an example embodiment, the seat cover 30 has a stitch count ranging from about 320 up to about 355, wherein the upper and lower ranges can change up to about +/−5%. In an example embodiment, the stitch length of the seat cover 30 is about 5 mm.

It should be pointed out that the seat cover may accommodate OEM seats having fixed or adjustable headrests. An advantage of the dimensions of the alignment or lockdown flap 36 is that proper installation and thus orientation is ensured when placing the seat cover 30 over a vehicle seat 10 so that the front seam 40 can be at or forward of a corresponding weakened or scored line within the OEM vehicle seat provided for airbag deployment.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, in one optional embodiment, the area shown as comprising the panel 38 may be open or have a void so that no material of the seat cover 30 is moved during airbag deployment. These and other similar modifications will readily suggest themselves to those skilled in the art, and are intended to be encompassed within the spirit of the present invention disclosed herein and the scope of the appended claims.

What is claimed is:

1. A seat cover for use with a vehicle seat having a side deployed airbag, the seat cover comprising:
   an upper section comprising a flexible woven fabric material that forms an enclosure and an opening provided in the material;
   an alignment element attached to the upper section adjacent the opening and including a resilient member set in the alignment element;
   an elongate side panel coupled to a lateral side of the upper section along an interface; and
   a frangible seam along a portion of the interface that fails at a force below a force that impedes airbag deployment, the frangible seam including a top stitching of a nylon thread, an underside stitching of a polyester thread, and a stitch length of about 5 mm, the top stitching having a strength greater than the strength of the underside stitching, a ratio of the strength of the top stitching to the strength of the underside stitching being about 7, so that when the side panel is aligned with an expected path of a deploying airbag, and the airbag is deployed, the force of the deploying airbag separates the panel from the upper section along the seam to form a gap and the airbag fully deploys through the gap, wherein the flexible woven fabric material comprises a weave of weft yarn and warp yarn so that the flexible woven fabric material is capable of flexing in any direction.

2. The seat cover of claim 1, further comprising a lower section joined to the upper section and comprising a flexible woven fabric material that forms an enclosure and having an opening.

3. The seat cover of claim 1, wherein at least one of the threads of the seam comprises an elongated element stitched through the panel and the upper section.

4. The seat cover of claim 1, wherein the panel extends from adjacent a portion of the opening and along the lateral side of the upper section to substantially adjacent a distal portion of the opening.

5. The seat cover of claim 4, wherein the seam extends along the length of a forward looking edge of the panel.

6. The seat cover of claim 1, wherein the airbag deploys through a seam provided in the vehicle seat, and wherein the upper section comprises a front side and the frangible seam in the upper section is disposed in a region between the seam provided in the vehicle seat and the front side.

7. A seat cover for use with a vehicle seat that is equipped with a side deployed airbag, the seat cover comprising:
   an upper section that forms an enclosure with an opening for receiving therein a seat back having the side deployed airbag;
   a lower section connected to the upper section and that is formed into an enclosure with an opening for receiving therein a seat cushion attached to the seat back to define a space between the seat back and seat cushion, wherein the upper section and the lower section each comprise a flexible woven fabric material;
   an alignment element attached to at least one of the upper section and the lower section adjacent the corresponding opening and including a resilient member set in the alignment element; and
   a frangible seam along a portion of a lateral side of the upper section that fails at a force below a force that impedes airbag deployment, the frangible seam including a top stitching of a nylon thread, an underside stitching of a polyester thread, and a stitch length of about 5 mm, the top stitching having a strength greater than the strength of the underside stitching, a ratio of the strength of the top stitching to the strength of the underside stitching being about 7, so that when the frangible seam is aligned with an expected path of a deploying airbag, and the airbag is deployed, the force of the deploying airbag cleaves the seam to form a gap in the upper section so that the airbag fully deploys through the gap, wherein the flexible woven fabric material comprises a weave of weft yarn and warp yarn so that the flexible woven fabric material is capable of flexing in any direction.

8. The seat cover of claim 7, further comprising an elongated side panel coupled to the lateral side of the upper section along an interface, wherein at least one of the threads of the seam comprises an elongated element single stitched through the panel and the upper section along a portion of the interface.

9. The seat cover of claim 7, wherein the alignment element includes a plurality of eyelets and the seat cover further includes a strap coupled to the lower section and including a hook, the hook being configured to releasably couple the strap to one of the eyelets to removably secure the seat cover to the vehicle seat.

10. A vehicle seat comprising:
a seat back having a front, back, and lateral sides;
an airbag provided in the seat back and oriented to have a projected airbag deployment path that exits the seat back through at least one of the lateral sides;
a seat cushion coupled with the seat back along a portion of the periphery of the seat cushion to define a space between the seat cushion and seat back;
a seat cover comprising:
an upper section enclosing a substantial portion of the seat back, the upper section comprising a flexible woven fabric material that forms an enclosure and an opening provided in the flexible woven fabric material for receiving the seat back;
a lower section enclosing a substantial portion of the seat cushion, the lower section comprising a flexible woven fabric material that forms an enclosure and an opening provided in the flexible woven fabric material for receiving the seat cushion, wherein the flexible woven fabric material of the upper section and the lower section comprises a weave of weft yarn and warp yarn so that the flexible woven fabric material is capable of flexing in any direction;
an alignment element attached to at least one of the upper section and the lower section adjacent the corresponding opening and including a resilient member set in the alignment element;
a side panel coupled to at least one of the lateral sides of the upper section along an interface; and
a frangible seam along a portion of the interface that fails at a force below a force that impedes airbag deployment, the frangible seam including a top stitching of a nylon thread, an underside stitching of a polyester thread, and a stitch length of about 5 mm, the top stitching having a strength greater than the strength of the underside stitching, a ratio of the strength of the top stitching to the strength of the underside stitching being about 7, so that when the side panel is aligned with the projected airbag deployment path, and the airbag is deployed, the force of the deploying airbag separates the panel from the upper section along the seam to form a gap and the airbag fully deploys through the gap.

11. The seat cover of claim 10, wherein at least one of the threads of the seam comprises an elongated element single stitched through the panel and upper section.

12. The seat cover of claim 10, further comprising eyelets in the alignment element selectively engageable with hooks attached to straps that depend from the lower section.

13. The seat cover of claim 10, wherein the airbag deploys through a seam provided in the vehicle seat, and wherein the upper section comprises a front side and the frangible seam in the upper section is disposed in a region between the seam provided in the vehicle seat and the front side.

* * * * *